Patented Apr. 4, 1939

2,152,722

UNITED STATES PATENT OFFICE 2,152,722

PROCESS OF SEPARATING MERCAPTANS CONTAINED IN A HYDROCARBON LIQUID

David Louis Yabroff, Berkeley, and Ellis R. White, Albany, Calif., assignors to Shell Development Company, San Francisco, Calif., a corporation of Delaware No Drawing. Application October 22, 1937, Serial No. 170,422

10 Claims. (Cl. 196—30)

This application is a continuation-in-part of our co-pending application Serial No. 124,688, filed February 8, 1937, relating to the removal of weakly acid reacting organic substances from solutions in certain water-insoluble organic liquids by extraction with an aqueous solution of caustic alkali, and in particular deals with the removal of mercaptans from petroleum distillates.

It is frequently necessary to eliminate small quantities of organic weakly acid reacting components such as mercaptans, phenols, alkyl phenols, thiophenols, etc., from their solutions in neutral or weakly basic reacting liquids which are substantially immiscible with water, such as the liquid hydrocarbons derived from petroleum, gasoline, kerosene, gas oil, benzene, toluene, xylene, substituted normally liquid hydrocarbons, of which chlorethane, ethylene, dichloride, trichlorethylene, carbon tetrachloride, chlorpropane, chlorbutylene, chlorbenzene, brombenzene are examples; or nitro hydrocarbons, for example nitroethane, nitrobenzene; or other nitrogen containing hydrocarbons such as amyl or higher amines, aniline, water insoluble pyridine derivatives, petroleum bases, etc.

In order that the hydrophobe organic liquids may be treated by our process they must be substantially inert and resistant to chemical reaction with strong aqueous caustic alkali when in contact therewith for relatively short periods of time, i. e., about 10 minutes or less at normal room temperatures.

It is the object of this invention to provide a method whereby acid reacting organic substances of the type hereinbefore described can be removed efficiently and at low cost from solutions in hydrocarbon type liquids. As a particular application, it is the object to remove mercaptans from strongly sour gasoline distillates to reduce their sulfur content and to produce sweet or nearly sweet gasolines of improved octane numbers and lead susceptibilities, requiring little after-treatment for complete sweetening, if any.

Our invention comprises extracting weak organic acids, e. g., having dissociation constants lower than those of fatty acids, such as mercaptans, phenols, etc., contained in hydrophobe organic liquids which are substantially inert toward strong aqueous caustic alkali solutions at normal room temperatures, with an aqueous solution of caustic alkali in which is dissolved a substantial amount of one or several alkali metal salts of certain substituted lower fatty acids, under conditions to absorb at least a major portion of the weak organic acids in the aqueous solution, and to form two layers, and separating the layers.

In our co-pending application Serial No. 118,920, filed January 2, 1937, we have disclosed that alkali metal salts of certain lower fatty acids promote the solvent power for weak organic acids of aqueous caustic alkali solutions in which they are dissolved. According to the present invention we prepare aqueous caustic alkali solutions possessing enhancing solvent properties for the weak organic acids by dissolving therein alkali metal salts of certain substituted lower fatty acids.

The salts used according to this invention are the alkali metal salts of aliphatic carboxylic acids having 3 to 7 and preferably 4 to 6 carbon atoms which possess, besides their carboxyl group, one neutral or alkaline reacting polar group. Of the various possible substitution groups which include hydroxyl, amino, halide, nitro, nitrile, sulfone, etc., radicals, we prefer the hydroxyl and amino radicals, not only because hydroxy and amino fatty acids, having the specified number of carbon atoms, are readily available, but also because they are substantially resistant to hydrolysis with steam in the presence of strong caustic alkali, the term hydrolysis as herein used including saponification. Resistance to hydrolysis usually is an important factor in the regeneration of spent caustic alkali solutions containing solubility promoters.

The polar substitution group may be situated in any position relative to the carboxyl group, except, that if the position is other than alpha position, ring compounds may be formed, some of which are less desirable than the open chain compounds.

Preferred alkali salts are the sodium and potassium salts, the potassium salt in many instances giving superior results because of a greater solubility in strong caustic alkali solutions.

The effectiveness of various salts in the matter of solubility promoting depends primarily on two factors: concentration of the salt limited by the solubility in the aqueous caustic alkali solution, and specific solubility promoting effect of the acid radical of the salt. The higher the concentration of a given solubility promoter in the caustic alkali solution, the greater is the solvent power of the latter for the weak organic acids to be extracted, and consequently it is desirable to incorporate into the caustic alkali solution the maximum amount of the solubility promoting salt which can be dissolved and which will not result in operating difficulties, due, for instance, to deposition of solids at some point of the extraction system, or to excessively high viscosities of the salt solution. Thus it is frequently advantageous to use caustic alkali solutions which are substantially saturated with the salts of our invention.

The specific solubility promoting effect generally increases with increasing size of the organic radical of the solubility promoting salt, but benefits from this source may be lost due to decreasing solubility of the salt in aqueous caustic alkali. Fatty acids containing a polar radical in addition to the carboxyl radical and having less than 3 carbon atoms, have extremely low specific solubility promoting powers, with the result that their alkali metal salts in spite of good solubilities in aqueous caustic alkali, can promote the solvent power of aqueous caustic alkali solutions but little. On the other hand, the homologous fatty acids having more than 7 carbon atoms although possessing favorable specific solubility promoting powers are insufficiently soluble in strong aqueous caustic alkali solutions to be of practical value. Moreover, fatty acids of more than 7 carbon atoms, such as those having 10 to 20 carbon atoms, tend to create stubborn emulsions between the aqueous and hydrophobe liquids, which are difficult to separate and seriously interfere with the extraction process.

Due to irregularities in the solubilities of the previously described various fatty acid salts having 3 to 7 carbon atoms, maximum solvent powers of the aqueous caustic alkali solutions containing same vary within wide limits. This is demonstrated by the examples below in which K values for n-amyl mercaptan as between iso-octane and 5N aqueous sodium hydroxide solution saturated with different salts are given, K being $$\frac{\text{Concentration mercaptans in aqueous phase}}{\text{Concentration mercaptans in hydrophobe phase}}$$

| Salt | Number of carbon atoms in salt | K value |
|---|---|---|
| None | | 1.0 |
| Na-alpha amino iso-butyrate | 4 | 7.6 |
| Na-alpha hydroxy n-butyrate | 4 | 5.1 |
| K-alpha hydroxy n-butyrate | 4 | 711 |
| Na-alpha hydroxy valerate | 5 | 37 |

As will be noted above the potassium alpha hydroxy n-butyrate possesses a solubility promoting power which appears to be entirely out of line. This is due to its remarkable solubility in caustic alkali solutions. It was found that at 20° C. a saturated solution of this salt in an aqueous solution of 5N sodium hydroxide contains 942 grams of the salt per liter. This saturated solution is liquid, though quite viscous. When extracting n-propyl mercaptans from gasoline therewith a K value of 4150 was obtained.

The K values for the potassium alpha hydroxy n-butyrate are higher than those found for any other salts of fatty acids heretofore discovered, and are sufficiently high to permit easy sweetening even of the most sour-reacting gasolines such as West Texas and California gasolines.

For instance, a California gasoline distillate boiling from 100° to 150° C. and containing .1606% mercaptan sulfur was extracted in six stages with 25% by volume of a 5N sodium hydroxide solution, in which was dissolved 900 grams per liter of potassium alpha hydroxy n-butyrate. The mercaptan sulfur was reduced to .0002% and the distillate was sweet by the doctor test.

The concentration of the potassium hydroxy butyrate in the caustic alkali solution is preferably as high as is practical according to principles explained before. The lower the concentration of the salt the more difficult it is to extract organic acids substantially completely. For instance, we have found that in order to sweeten strongly sour hydrocarbon distillates such as West Texas or California gasolines the concentration of this butyrate must not be less than about 600 grams per liter and is preferably between 700 grams per liter and saturation.

Instead of using individual fatty acid salts of the type herein described, mixtures of several acids may be used as well. For instance, amino fatty acids such as may be obtained in the hydrolysis of proteins with hydrochloric acid are useful, particularly if the average content of the carbon atoms per molecule of the mixture so produced is between the limits of 3 to 7 and preferably between 4 to 6. Suitable fractions may be isolated from hydrolytic decomposition of mixtures of proteins by conventional fractionation as distillation, solvent extraction, etc. Moreover, the mixtures need not consist altogether of the free carboxylic acids, but a portion thereof may be in the form of anhydrides having ring structures, for example of the type of betain.

Other organic water-soluble substances capable of increasing the solubility of weak organic acids in aqueous caustic alkali solutions may be added to the solutions containing salts of the substituted carboxylic acids of this invention in order to modify the solvent effect of the latter. Such substances are disclosed, for instance in the co-pending applications Serial Nos. 102,892, filed September 28, 1936; 102,893, filed September 28, 1936; 118,920, filed January 2, 1937; 124,689, filed February 8, 1937; and 124,690, filed February 8, 1937.

Aqueous solutions of various caustic alkalis may be used. The alkali metal hydroxides are the most useful and efficient, although ammonia, alkaline earth hydroxides, quaternary ammonia bases, alkali metal carbonates, etc., may also be suitable.

Concentrations of the caustic alkali in the aqueous solution may vary within wide limits. In general we prefer to use alkali metal hydroxide solutions which are above about 2 normal and preferably between about 4 to 10 normal in the absence of the fatty acid salt, although lower concentrations may be used. While the solubilities of fatty acid salts generally decrease with increasing concentration of the caustic alkali, gains in the alkalinity of relatively strong solutions often more than offset losses in solvent power due to decreases in the solubility of the promoting salt.

The amount of aqueous caustic alkali solution required in the extraction is usually above about 5 volume per cent and for economical reasons seldom exceeds 100 volume per cent. When extracting mercaptans from hydrocarbon distillates with aqueous caustic alkali being substantially saturated with potassium alpha hydroxy n-butyrate, for the purpose of sweetening, normally about 10 to 50 volume per cent are required depending upon the boiling range of the hydrocarbons and the type and amount of mercaptans contained therein. The higher the boiling range of the distillate and the more carbon atoms the mercaptans contain, the more caustic alkali solution containing the butyrate is required.

Although solubility of the fatty acid salts increases, and the viscosities of solutions saturated at normal room temperature decrease with increasing temperatures, the application of elevated temperatures during extraction offers few advantages, if any, because the extraction powers of the caustic alkali solutions containing a certain amount of solubility promoters decrease in the same direction. On the other hand at very low temperatures highly concentrated solutions of the salts tend to congeal. Therefore we usually prefer to operate at temperatures between about 0° C. to 60° C. and preferably between 15° and 35° C.

Extraction of the weak organic acids from solutions in organic hydrophobe liquids may be carried out by simply mixing this solution with a given amount of the aqueous caustic alkali solution in which is dissolved a substantial proportion of the salts of our invention and then separating the aqueous and hydrophobe liquids. More thorough extraction however, can be had in a multi-stage countercurrent extraction system.

Spent caustic alkali solutions containing the salts of this invention and the weak organic acids may be regenerated by steaming and/or oxidation according to well known principles.

We claim as our invention:

1. In the process of separating acid reacting substances contained in a water-insoluble neutral or basic organic liquid, the steps comprising treating said liquid with an aqueous solution of a strong base containing a substantial amount of a dissolved salt of an aliphatic hydroxy carboxylic acid, having from 3 to 7 carbon atoms, under conditions to absorb at least a portion of said acid reacting substance in said aqueous solution and to form two liquid layers, one comprising the aqueous solution containing absorbed acid reacting substances and the other consisting essentially of the treated organic liquid, and separating the layers.

2. The process of claim 1 in which the aliphatic carboxylic acid salt has a polar radical in alpha position to the carboxyl radical.

3. The process of claim 1 in which the aliphatic carboxylic acid salt is a salt of an alkali metal.

4. The process of claim 1 in which the aqueous solution is substantially saturated with the aliphatic carboxylic acid salt.

5. The process of claim 1 in which the aqueous solution is a 2–10 normal alkali metal hydroxide solution.

6. In the process of removing mercaptans contained in a hydrocarbon distillate by extraction with an aqueous solution of alkali metal hydroxide, the improvement comprising extracting said distillate with not less than 5 volume per cent of an aqueous solution of alkali metal hydroxide in which is dissolved at least 600 grams per liter potassium alpha hydroxy n-butyrate, under conditions to form two layers, one comprising an aqueous alkali metal hydroxide layer containing the butyrate and the major portion of the mercaptans, and the other consisting essentially of hydrocarbon distillate, and separating the layers.

7. In the process of sweetening a sour hydrocarbon distillate containing mercaptans, by extraction with an aqueous solution of an alkali metal hydroxide, the improvement comprising countercurrently extracting said distillate with 10 to 50 volume per cent of an aqueous solution of a 2–10 normal alkali metal hydroxide in which is dissolved not less than 700 grams per liter potassium alpha hydroxy n-butyrate, under conditions to form two layers, one comprising an aqueous alkali metal hydroxide layer containing the butyrate and the major portion of the mercaptans, and the other consisting essentially of sweet hydrocarbon distillate, and separating the layers.

8. The process of claim 1 in which the carboxylic acid is alpha hydroxy valeric acid.

9. The process of claim 1 in which the carboxylic acid is alpha hydroxy n-butyric acid.

10. In the process of separating mercaptans contained in a hydrocarbon liquid, the steps comprising treating said liquid with an aqueous solution of an alkali metal hydroxide containing a substantial amount of a dissolved alkali metal salt of an aliphatic hydroxy carboxylic acid having from 3 to 7 carbon atoms, under conditions to absorb at least a portion of said mercaptans in said aqueous solution and to form two liquid layers, one comprising the aqueous solution containing absorbed mercaptans and the other consisting essentially of the treated hydrocarbon liquid, and separating the layers.

DAVID LOUIS YABROFF.
ELLIS R. WHITE.